US012383954B1

United States Patent
Birman

(10) Patent No.: US 12,383,954 B1
(45) Date of Patent: Aug. 12, 2025

(54) SYSTEM AND METHOD OF PREPARING A METAL OBJECT FOR MACHINING

(71) Applicant: TECHJET AEROFOILS LTD, Migdal Tefen (IL)

(72) Inventor: Idan Birman, Naharia (IL)

(73) Assignee: TECHJET AEROFOILS LTD, Migdal Tefen (IL)

( * ) Notice: Subject to any disclaimer, the term of this patent is extended or adjusted under 35 U.S.C. 154(b) by 0 days.

(21) Appl. No.: 19/039,795

(22) Filed: Jan. 29, 2025

(51) Int. Cl.
| | |
|---|---|
| *B22D 19/00* | (2006.01) |
| *B22D 25/02* | (2006.01) |
| *B22D 29/00* | (2006.01) |
| *B23P 15/02* | (2006.01) |
| *B22C 9/22* | (2006.01) |
| *B22D 17/20* | (2006.01) |
| *B22D 19/10* | (2006.01) |

(52) U.S. Cl.
CPC .......... *B22D 19/009* (2013.01); *B22D 25/02* (2013.01); *B22D 29/003* (2013.01); *B23P 15/02* (2013.01); *B22C 9/22* (2013.01); *B22D 17/2076* (2013.01); *B22D 19/10* (2013.01); *Y10T 29/49799* (2015.01); *Y10T 29/49812* (2015.01); *Y10T 29/49989* (2015.01)

(58) Field of Classification Search
CPC ... B23P 15/02; B22D 17/2076; B22D 19/009; B22D 19/10; B22D 25/02; B22D 29/003; Y10T 29/49799; Y10T 29/49812; Y10T 29/49989; B22C 9/22
See application file for complete search history.

(56) References Cited

U.S. PATENT DOCUMENTS

| | | | | |
|---|---|---|---|---|
| 4,017,961 A | * | 4/1977 | Kochte | G05G 1/12 264/278 |
| 4,505,016 A | * | 3/1985 | Roberts | B23P 15/00 164/112 |
| 5,177,866 A | * | 1/1993 | Bennett | B23P 15/001 29/434 |

(Continued)

FOREIGN PATENT DOCUMENTS

| | | | | |
|---|---|---|---|---|
| CN | 107984179 A | * | 5/2018 | ............. B23P 15/02 |
| JP | 3808258 B2 | * | 8/2006 | ............. B22C 9/101 |
| WO | WO-2015092218 A1 | * | 6/2015 | ............. B22D 13/00 |

OTHER PUBLICATIONS

Machine translation for JP 3808258 B2 (Year: 2006).*

*Primary Examiner* — Jermie E Cozart
(74) *Attorney, Agent, or Firm* — PEARL COHEN ZEDEK LATZER BARATZ LLP

(57) ABSTRACT

A system and method of preparing a metal object for machining, wherein the metal object comprises at least two working portions that are to be machined and that are connected to remote sides or ends of an intermediate portion of the metal object, the method comprising: inserting the intermediate portion into a casting mold, such that the at least two working portions protrude from the casting mold; pouring a liquid metal material into the casting mold so as to cover the intermediate portion; allowing the liquid metal to cool, thereby forming a cast bulk surrounding the intermediate portion of the metal object; and removing the casting mold, whereby the cast bulk enables machining of the at least two working portions to be carried out while the second cast segment is being held.

6 Claims, 7 Drawing Sheets

(56) References Cited

U.S. PATENT DOCUMENTS

2014/0286777 A1\* 9/2014 Gimel .................. F01D 5/3015
                                                416/193 A
2016/0107279 A1\* 4/2016 Horn .................... F01D 25/285
                                                29/889.7

\* cited by examiner

SYSTEM AND METHOD OF PREPARING A METAL OBJECT FOR MACHINING

FIELD OF THE INVENTION

The present invention relates to machining of a metal object. More particularly, the present invention relates to systems and methods for preparing a metal object to enable machining of multiple parts of the metal object.

BACKGROUND OF THE INVENTION

Metal fabrication or machining is a known process of shaping elements (e.g., elements made of alloys), and modification of their physical dimensions, by removing any unwanted material from the element, for instance by use of a sharp cutting tool.

The goal of such a machining process is to produce an element that has a desired size and shape. For example, machining may be carried out by, e.g., drilling, turning, milling, and grinding.

In order for machining to accurately shape delicate or small objects, it may be necessary for the delicate or small objects to be tightly gripped during this process in order to prevent movement of the object during machining. However, tight gripping may also cause damage to such delicate or small objects.

Thus, a known process of encapsulation is applied in which a material having a low melting temperature encapsulates the delicate or small object, and it is the encapsulating material, rather than the object itself, that is then gripped during the machining process.

For example, a material with a melting temperature of 150-200 degrees Celsius can be poured in liquid form to encapsulate a metallic object for machining, while keeping out of the encapsulation material the specific portion of the metallic object that is to be machined.

Once the desired form of the encapsulation surrounding the object is achieved, the material can be cooled until the encapsulation material is solidified, so as to enable the hardened encapsulation material to be gripped while the portion of the object outside the encapsulation is being machined.

After machining is completed, heat may be applied to the encapsulation to liquefy the material in order to remove the object therefrom.

Currently, as described below, separate molds are required for machining different parts of an object, since a different mold would be needed for each portion of the object that is intended to undergo machining.

Reference is made to FIGS. 1A and 1B, which show illustrations of prior art encapsulation of a metal object 10. Some portions of the metal object 10 can be intended for machining, such as portions 11 and 12, while other portions of the metal object 10 are intended for other uses without machining, such as intermediate portion 13. FIGS. 1A and 1B illustrate the two stages during which portions 11 and 12 of object 10 can be machined.

FIG. 1A shows the first stage encapsulation of the metal object 10, such that portion 12 is available for machining. As shown in FIG. 1A, prior art methods for machining the metal object 10 include encapsulating portions 11 and 13 of the metal object 10 by a dedicated material 20, such that the encapsulation material 20 surrounds portions 11 and 13 of the metal object 10.

The dedicated material may be, for example, a metal with a low melting point temperature.

A portion 12 of the metal object 10 that is to be machined is kept outside of the encapsulation material 20 in order to allow machining (e.g., by an external tool not shown in FIG. 1A) of portion 12.

In order for accurate machining of portion 12 to be enabled, the encapsulation 20 may be tightly held by an external tool (not shown in FIG. 1A) so as to prevent movement of portion 12 during the machining process.

Portions 11 and 13 of the metal object 10 are unchanged during the machining process, since they are encased within encapsulation material 20, and the encapsulation 20 is tightly held during the machining process, thereby protecting portions 11 and 13 of the metal object 10.

Once the machining of portion 12 is completed, the encapsulation material 20 may be removed from around portions 11 and 13 of metal object 10.

For instance, in one embodiment, the encapsulation material 20 may be removed by heating it to its melting point, such that the liquid material 20 can be removed, leaving only the unencased metal object 10.

FIG. 1B shows the second stage encapsulation of the metal object 10, such that portion 11 is available for machining. In one embodiment, as shown in FIG. 1B, once the machining of portion 12 is completed, and the encapsulation 20 shown in FIG. 1A is removed, portions 12 and 13 of the metal object 10 are encased by low melting point temperature material 21, such that a new encapsulation 21 surrounds portions 12 and 13 of the metal object 10.

At this stage, portion 11 of the metal object 10 that is to be machined is kept outside of the encapsulation material 21 to allow it to be machined (e.g., by an external tool not shown in FIG. 1B).

In order for accurate machining of portion 11 to be enabled, the encapsulation 21 may be tightly held by an external tool (not shown in FIG. 1B) so as to prevent movement of portion 11 during the machining process.

Portions 12 and 13 of the metal object 10 are unchanged during the machining process, since they are encased within encapsulation material 21, and the encapsulation 21 is tightly held during the machining process, thereby protecting portions 12 and 13 of the metal object 10.

Once the machining of portion 11 is completed, the encapsulation material 21 may be removed from around portions 12 and 13 of metal object 10.

For instance, in one embodiment, the encapsulation material 21 may be removed by heating it to its melting point, such that the liquid material 21 can be removed, leaving an unencased metal object 10, after machining of both portions 11 and 12.

As illustrated in FIGS. 1A and 1B, a process of machining separate portions of an object requires performing a separate encapsulation for each of the portions to be machined. This process is costly, time consuming and cumbersome. Accordingly, another solution is required in order to reduce the costs and time for such machining.

It would be desirable to provide a system and method for preparing a metal object to enable machining of multiple parts of the metal object.

SUMMARY OF THE INVENTION

There is thus provided in accordance with some embodiments of the invention, a method of preparing a metal object for machining, wherein the metal object includes at least two working portions, i.e., portions that are to be machined, that are connected to opposite or remote sides or ends of an intermediate portion of the metal object, including: inserting the intermediate portion into a casting mold, such that the at least two working portions protrude from the casting mold, pouring a liquid metal material into the casting mold so as to cover the intermediate portion, allowing the liquid metal to cool, thereby forming a cast bulk surrounding the intermediate portion of the metal object, wherein the cast bulk includes a first cast segment that is adjacent to and surrounds the intermediate portion and a second cast segment that is remote from the intermediate portion, and removing the casting mold.

In some embodiments, the cast bulk enables machining of the at least two working portions of the object to be carried out while the second cast segment is being held.

In some embodiments, the cast bulk is configured such that heating of the cast bulk back into the liquid metal will allow the liquid metal to be removed from the intermediate portion.

In some embodiments, the intermediate portion of the metal object maintains structural integrity during machining of the at least two portions.

In some embodiments, the metal object is an airfoil.

In some embodiments, the liquid metal is a Cerrotru alloy.

In some embodiments, machining is carried out on the at least two working portions.

In some embodiments, machining of the at least two working portions is configured to be carried out simultaneously.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1A:
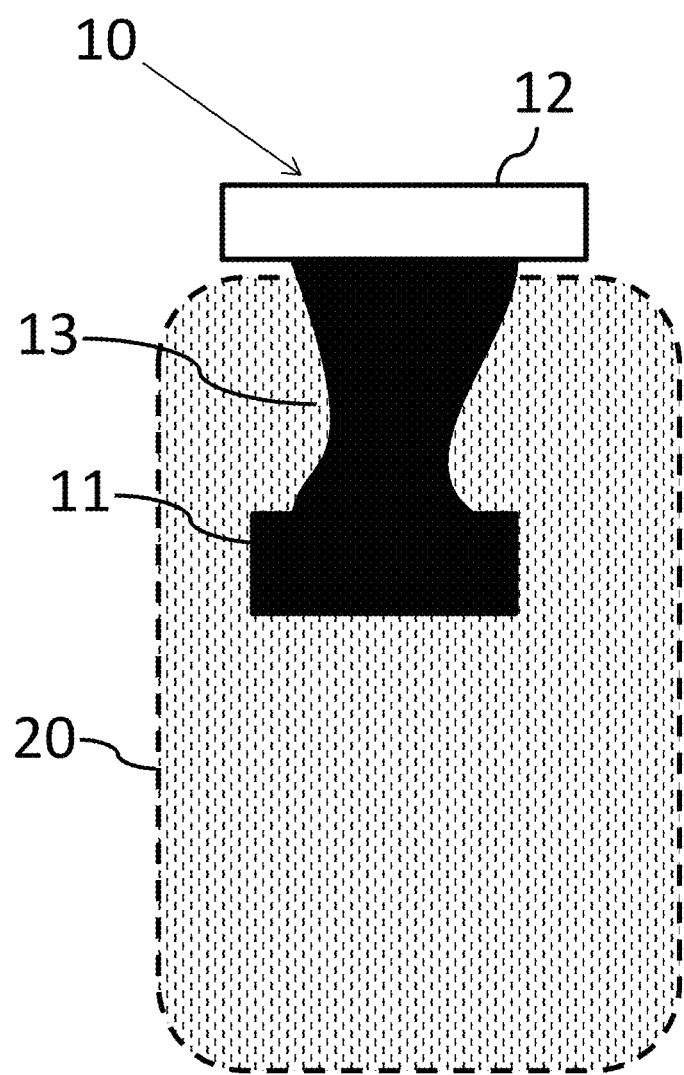
FIGS. 1A and 1B show illustrations of prior art encapsulation of a metal object.
Figure 1B:
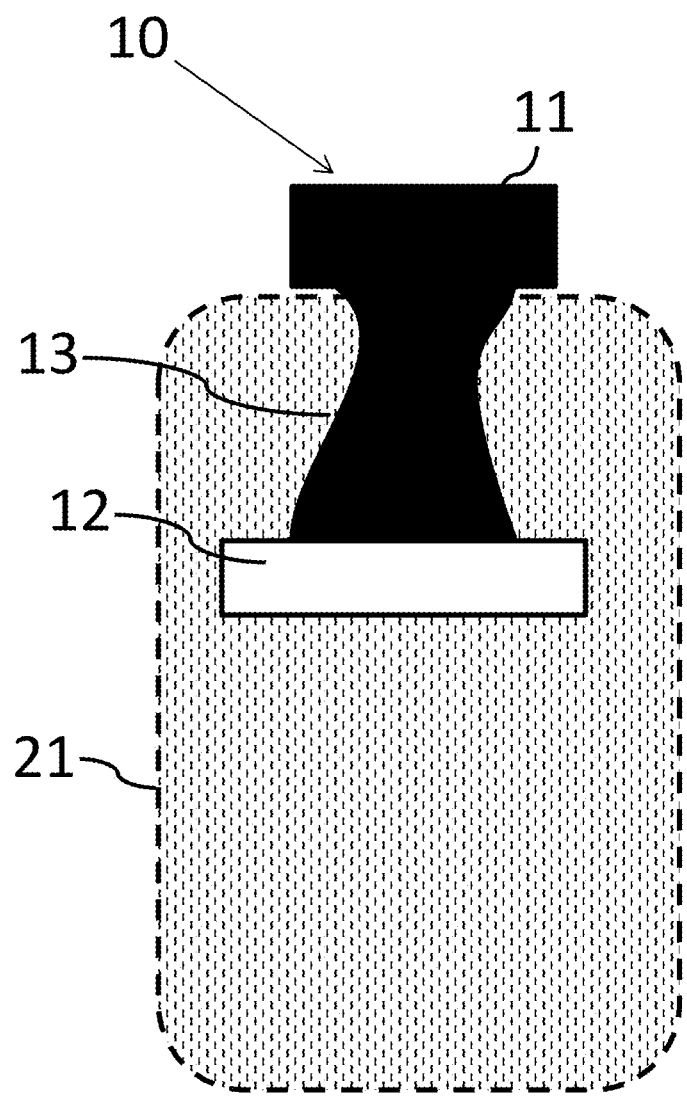

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details.

In other instances, well-known methods, procedures, and components, modules, units and/or circuits have not been described in detail so as not to obscure the invention.

Some features or elements described with respect to one embodiment may be combined with features or elements described with respect to other embodiments.

For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more".

The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order or sequence. Additionally, some of the described method embodiments or elements thereof may occur or be performed simultaneously, at the same point in time, or concurrently.

Figure 2:
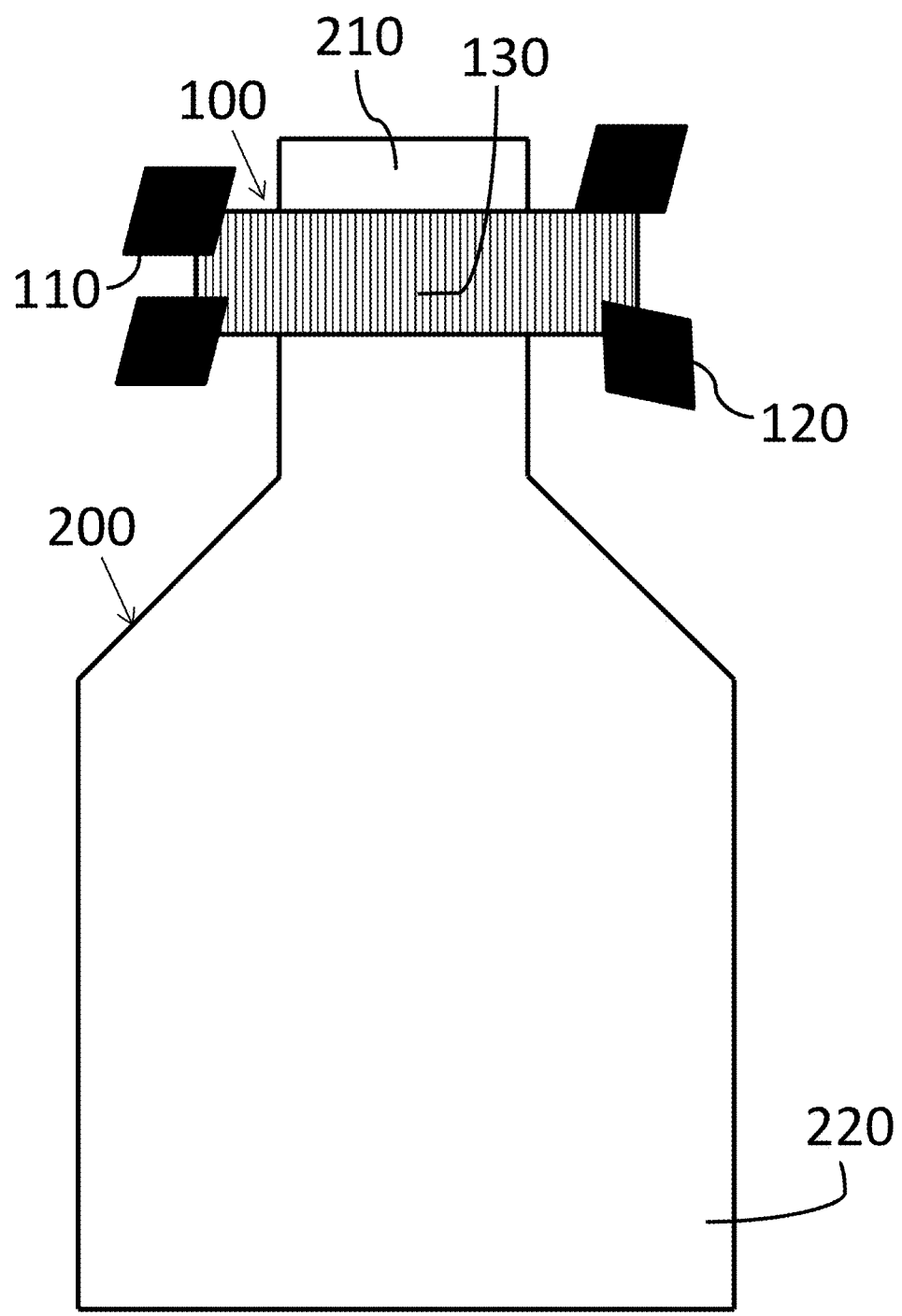
FIG. 2 shows an illustration of a cross-section view of a metal object that is being prepared for machining, according to some embodiments of the invention.

Reference is now made to FIG. 2, which shows an illustration of a cross-section view of a metal object 100 that is being prepared for machining, according to some embodiments of the invention.

Since many objects for which machining may be needed may be fragile and cannot be tightly held for the machining process without being damaged, an improved method and system are provided to protect the object while reducing the required costs and working time.

According to some embodiments, metal objects may be produced (e.g., in a factory) as a single unit including multiple portions of which machining is subsequently needed (referred hereinafter as "working portions"), for instance in order to reduce costs and working time for production.

Such a metal object 100 may include at least two working portions 110, 120 that are to be machined, wherein the at least two working portions 110, 120 may be connected to different, e.g., remote, ends of an intermediate portion 130 of the metal object 100.

In some embodiments, as discussed hereinbelow, metal object 100 may include an airfoil, e.g., used for a jet engine. An airfoil is a thin metal sheet with defined and/or precise geometry. Clamping of an airfoil for the purpose of machining may require special tools or materials, while clamping of a simple surface may require simple clamping tools. In some embodiments, after machining of the at least two working portions 110, 120, those at least two working portions 110, 120 may be removed for other uses, while the intermediate portion 130 remains to be utilized for an airfoil.

The metal object 100 may be inserted into a dedicated casting mold (not shown in FIG. 2) such that the intermediate portion 130 is within the casting mold but the at least two working portions 110, 120 are without, e.g., protrude from, the casting mold.

A metallic material, with a low melting point temperature, may be poured, while in liquid form, into the casting mold, so as to surround intermediate portion 130 of metal object 100 (that is within the casting mold), i.e., for encapsulation.

Once the metallic material is cooled and solidifies around intermediate portion 130, a cast bulk 200 may be formed by the cooled metallic material in the shape of the casting mold.

The cast bulk 200 may include a first cast segment 210 that is adjacent to and surrounds the intermediate portion 130, and a second cast segment 220 that is remote from the intermediate portion 130. In some embodiments, the second cast segment 220 is configured to be held by an external tool.

In some embodiments, the size and/or shape of the first cast segment 210 may be different from the size and/or shape of the second cast segment 220 to allow access to the at least two working portions 110, 120 of metal object 100 for machining.

In some embodiments, the size and/or shape of the first cast segment 210 may be adapted for various shapes and/or sizes of the intermediate portion 130, such that the entire intermediate portion 130, but not working portions 110, 120 that protrude from intermediate portion 130, is surrounded by, and is protected by, the first cast segment 210 during machining.

For example, intermediate portion 130 may maintain structural integrity during machining of the at least two working portions 110, 120 of metal object 100 due to the protection of the first cast segment 210.

Once the metallic material has cooled and has solidified around intermediate portion 130, the casting mold (not shown in FIG. 2) may be removed, allowing cast bulk 200 to be held (e.g., by an external tool not shown in FIG. 2) for machining of the at least two working portions 110, 120.

For example, the casting mold (not shown in FIG. 2) may be removed by mechanical means.

Thus, there is no need to use separate molds for different parts of the metal object 100 that have different sizes and/or shapes, since use of a cast bulk 200 is applicable to all shapes and/or sizes that can fit within the particular casting mold. For example, a size difference of only 5 millimeters between two different metal objects may normally cause a significant difference in structural integrity during machining if mold is in the wrong size for these objects. Accordingly, the external size and/or shape of the cast bulk 200 is unchanged for different sizes of a metal object that can fit within the particular casting mold.

In some embodiments, the external size and/or shape of the cast bulk 200 is unchanged for different types of metal object 100, while the external opening that accommodates the intermediate portion 130 of the metal object 100 may vary. For example, two different cast bulks may be used for two different intermediate portion such as intermediate portion 130.

According to some embodiments, the at least two working portions 110, 120 may be machined simultaneously, while the cast bulk 200 is being held by an external tool.

In some embodiments, the at least two working portions 110, 120 may be machined separately and at different times, while the cast bulk 200 is being held by an external tool.

Reference is now made to FIGS. 3A-3E, which show an illustration of the metal object 100, within the cast bulk 200, that is being prepared for machining, according to some embodiments of the invention.

Figure 3A:
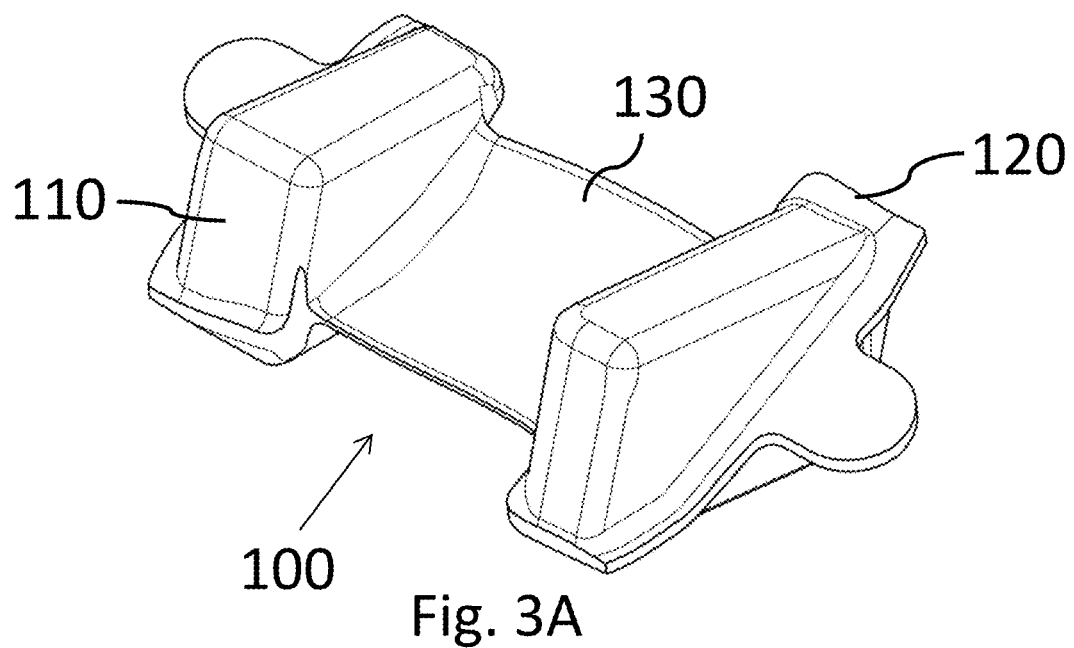
FIGS. 3A-3E show an illustration of the metal object, within a cast bulk, that is being prepared for machining, according to some embodiments of the invention.

FIG. 3A shows the metal object 100 to be prepared for machining. The metal object 100 includes at least two working portions 110, 120 at opposite ends of the intermediate portion 130.

Figure 3B:
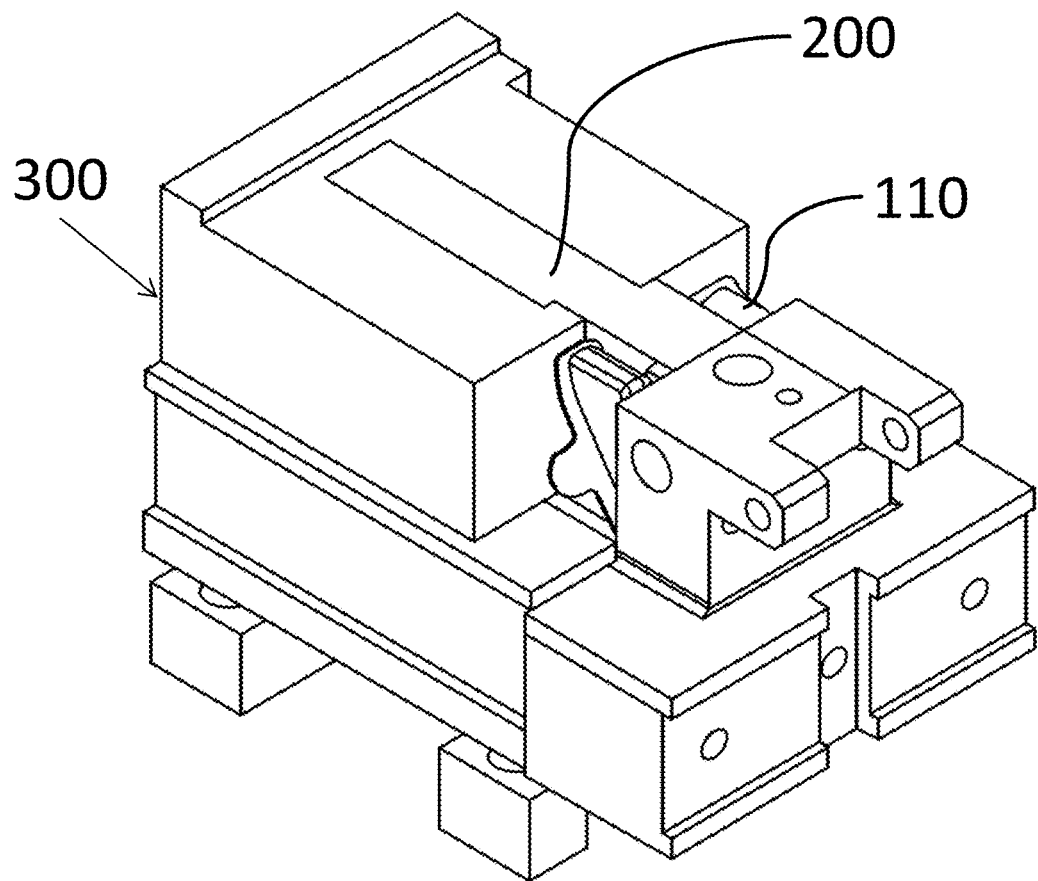
Figure 3C:
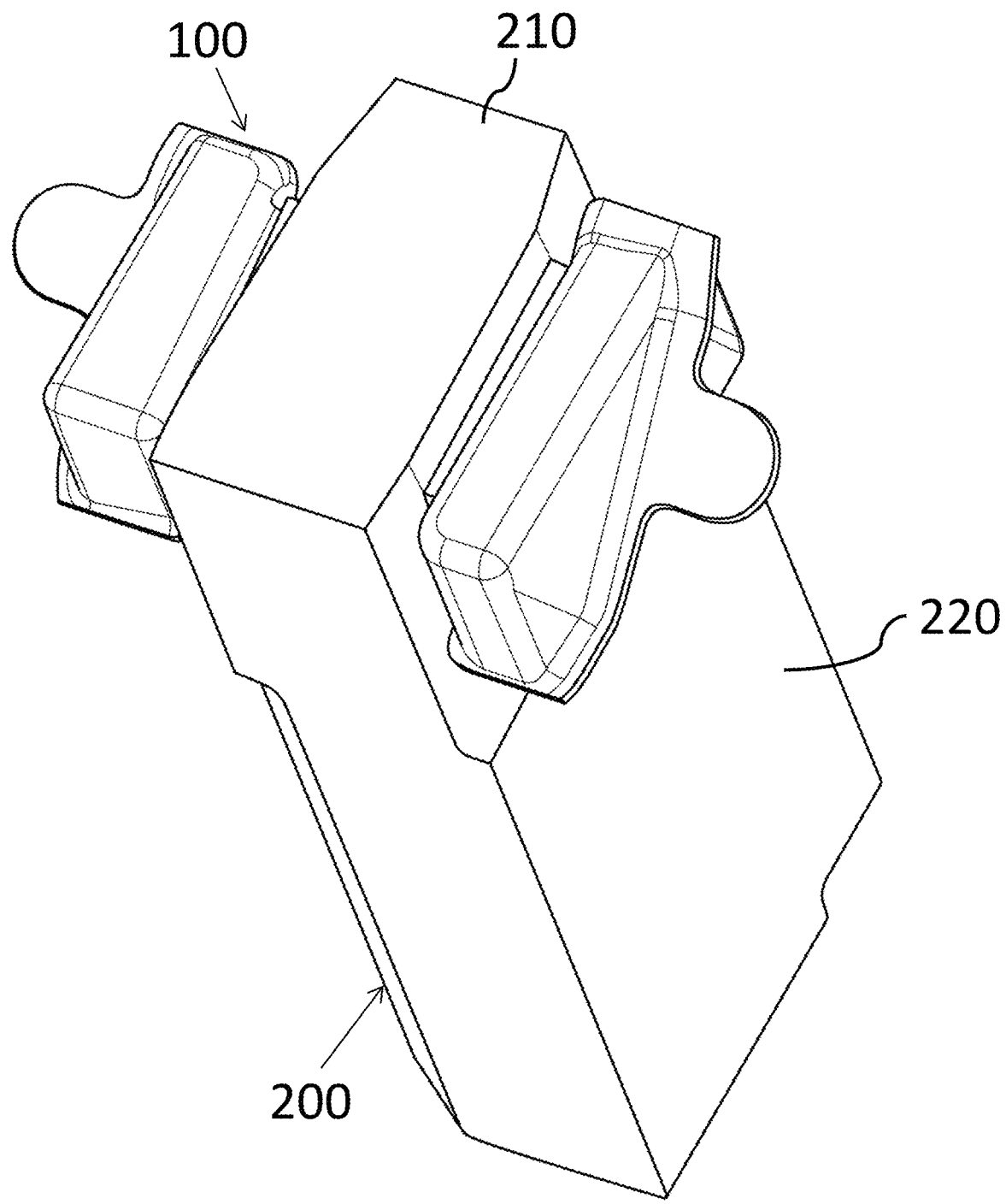

As shown in FIG. 3B, cast bulk 200, which encapsulates intermediate portion 130 but not working portions 110, 120, may be created by a casting mold 300, shown in FIG. 3C. When the metal object 100 is placed within the casting mold 300, the at least two working portions 110, 120 may protrude outward from casting mold 300 (in order to be accessible for machining at a later stage), while the intermediate portion 130 is covered by the cast bulk 200.

Figure 3D:
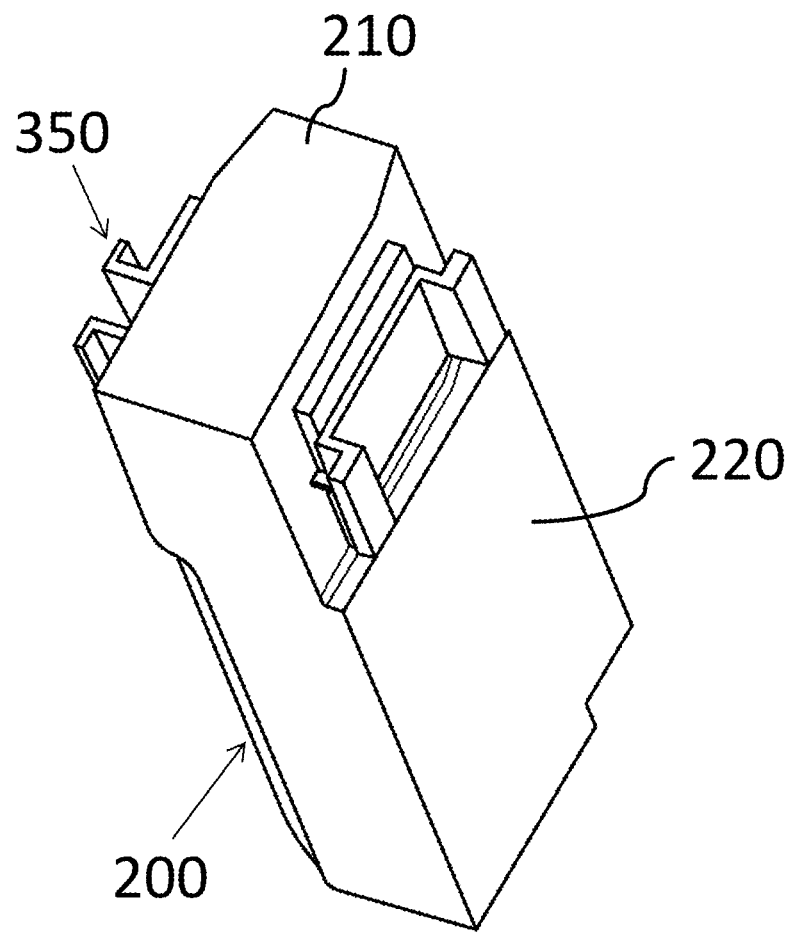

FIG. 3C shows the metal object 100 positioned within the cast bulk 200 in casting mold 300. As seen in FIG. 3D, the cast bulk 200 includes a first cast segment 210 that is adjacent to and surrounding the intermediate portion 130, and a second cast segment 220 that is remote from the metal object 100.

The machining process of two distinct portions of object 100 becomes more efficient, even when the at least two working portions 110, 120 will be machined separately, since there is no longer a need for multiple encapsulation/decapsulation processes of the multiple portions of the metal object when different parts need to be machined.

Once the machining of the at least two working portions 110, 120 is completed, the cast bulk 200 may be removed from around the intermediate portion 130 of metal object 100, as described above.

In some embodiments, the metallic material is recyclable and, once melted and separated from the metal object 100, may be used again for the next unit in liquid form.

For example, the metallic material may include a Cerrotru alloy having a melting point temperature of 138 degrees Celsius (281° Fahrenheit).

Figure 3E:
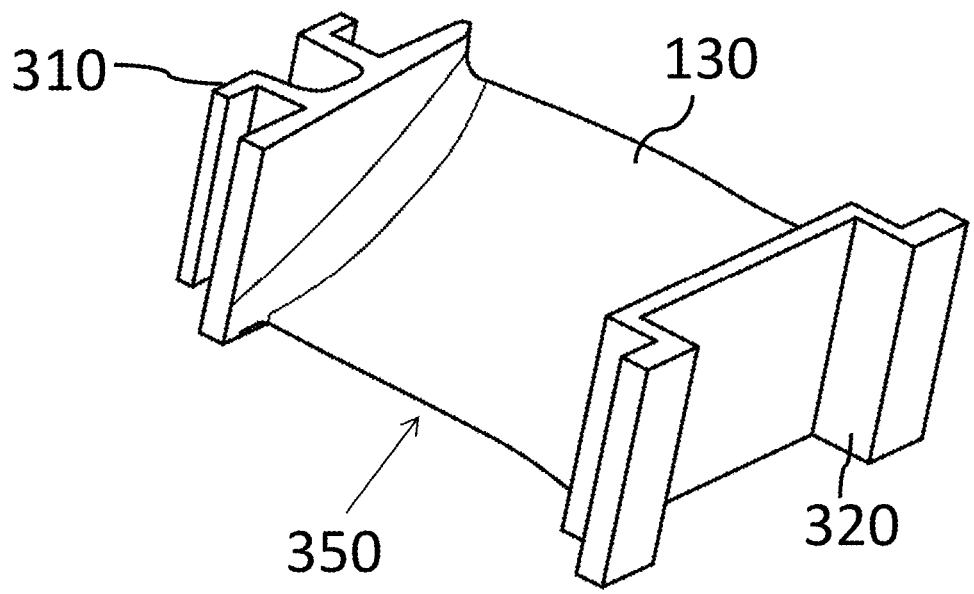

FIG. 3D shows the metal object 100 positioned within the cast bulk 200, wherein a portion of the prepared metal object 350, which is the prepared version of metal object 100 after machining has been completed positioned within the cast bulk 200 after machining of working portions 110, 120 has been completed, and FIG. 3E shows the prepared metal object 350 after the cast bulk 200 has been removed.

For instance, in one embodiment, the metallic material of the cast bulk 200 may be removed by heating it to its melting point, such that the liquid material may be removed, leaving only the prepared metal object 350.

Once the machining of the at least two working portions 110, 120 is completed, as shown in FIG. 3E, the prepared metal object 350 has prepared portions 310, 320 that result from the machining of working portions 110, 120, respectively, which are portions of the prepared metal object 350 that may be utilized separately, or alternatively utilized as a single unit. For example, the prepared portions 310, 320 of the prepared metal object 350 may be utilized in manufacturing of additional objects (e.g., such as airfoils).

Figure 4:
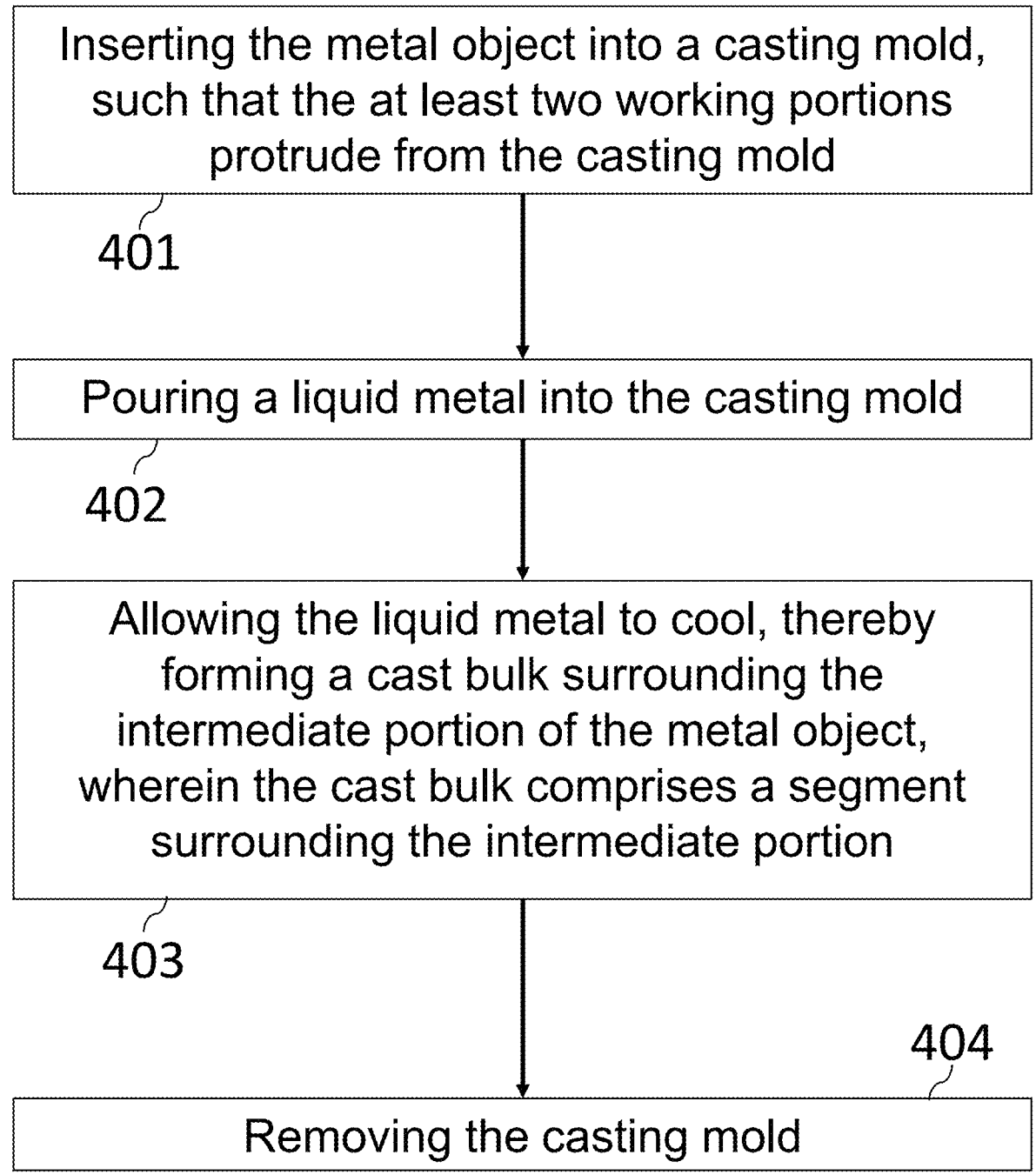
FIG. 4 shows a flowchart for a method of machining at least two metal objects, according to some embodiments of the invention.

Reference is made to FIG. 4, which shows a flowchart for a method of preparing a metal object for machining, according to some embodiments of the invention.

The at least two working portions 110, 120 of the metal object 100 may be connected to opposite sides or ends of an intermediate portion 130 of the metal object 100 (e.g., as shown in FIG. 2).

In some embodiments, the metal object 100 may be inserted 401 into a casting mold, such that the at least two working portions protrude from the casting mold. Then, a liquid metallic material may be poured 402 into the casting mold such that the intermediate portion 130 is covered by the liquid metallic material but such that the at least two working portions 110, 120 are not covered by the liquid metallic material.

The liquid metallic material may cool 403, thereby forming a cast bulk 200 surrounding the intermediate portion 130, wherein the cast bulk 200 includes a first cast segment 210 that is adjacent to and surrounds the intermediate portion 130 and a second segment 220 that is remote from the intermediate portion.

The casting mold may be then removed 404, and the second cast segment 220 of the cast bulk 200 may be held by an external tool to enable machining of the at least two working portions 110, 120 of the metal object 100 that protrude from the cask bulk 200.

In some embodiments, the machining may be carried out while the second cast segment 220 is being held by an external tool.

In some embodiments, the machining of the two portions 110, 120 may be carried out simultaneously while the second cast segment 220 is being held.

According to some embodiments, such machining method may reduce working time and costs by a significant factor since several steps are no longer required, such as application of the cast bulk on second portion of the unit as with previous solutions.

For example, using this method the processing time to complete the machining of the working portions of the metal object may be reduced by 16 minutes compared to similar result with previous solutions.

While certain features of the invention have been illustrated and described herein, many modifications, substitutions, changes, and equivalents may occur to those skilled in the art. It is, therefore, to be understood that the appended claims are intended to cover all such modifications and changes.

Various embodiments have been presented. Each of these embodiments may of course include features from other embodiments presented, and embodiments not specifically described may include various features described herein.

The invention claimed is:

1. A method of preparing a metal object for machining, wherein the metal object comprises at least two working portions that are to be machined and that are connected to remote sides or ends of an intermediate portion of the metal object, the method comprising:
   inserting the intermediate portion into a casting mold, such that the at least two working portions protrude from the casting mold;
   pouring a liquid metal material into the casting mold so as to cover the intermediate portion;
   allowing the liquid metal to cool, thereby forming a cast bulk surrounding the intermediate portion of the metal object, wherein the cast bulk comprises a first cast segment that is adjacent to and surrounds the intermediate portion and a second cast segment that is remote from the intermediate portion; and
   removing the casting mold;
   whereby the cast bulk enables machining of the at least two working portions to be carried out while the second cast segment is being held, and
   wherein the metal object is an airfoil.

2. The method of claim 1, wherein the cast bulk is configured such that heating of the cast bulk back into the liquid metal will allow the liquid metal to be removed from the intermediate portion.

3. The method of claim 1, wherein the intermediate portion of the metal object maintains structural integrity during machining of the at least two working portions.

4. The method of claim 1, wherein the liquid metal is a Cerrotru alloy.

5. The method of claim 1, further comprising machining of the at least two portions.

6. The method of claim 5, wherein machining of the at least two portions is configured to be carried out simultaneously.

* * * * *